UNITED STATES PATENT OFFICE.

ROBERT F. GARDINER, OF CLARENDON, VIRGINIA.

PROCESS FOR PRODUCING A MIXED POTASH AND NITROGEN FERTILIZER.

1,261,117.   Specification of Letters Patent.   Patented Apr. 2, 1918.

No Drawing.   Application filed August 6, 1917.   Serial No. 184,750.

(DEDICATED TO THE PUBLIC.)

*To all whom it may concern:*

Be it known that I, ROBERT F. GARDINER, a citizen of the United States of America, and an employee of the Department of Agriculture of the said United States, residing at Clarendon, in the county of Alexandria, State of Virginia, (whose post-office address is Clarendon, Virginia,) have invented a new and useful Process for Producing a Mixed Potash and Nitrogen Fertilizer.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to the production of potassium sulfate or potassium ammonium sulfate or any other primary or secondary potassium or combined potassium and potassium ammonium salts or mechanical mixtures of the same, by means of the direct or indirect action either by fusion with or in contact in water solution with ammonium sulfate, ammonium acid sulfate, ammonium pyrosulfate, or any intermediary compounds formed by means of heating ammonium sulfate, under suitable conditions from 25° centigrade up to the dissociation temperature of ammonium sulfate either in a dry or wet state, with or without pressure, in contact with either alunite, leucite, muscovite or orthoclase, collectively or individually, when ground to pass through sieves of a fineness of from 60 mesh, up to and including 200 mesh. By mesh is meant the number of meshes in the sieves employed to the linear inch.

The objects of my invention are:

1. To obtain a potash and nitrogenous fertilizer by direct treatment of a suitable potash bearing mineral with nitrogen carrying salts, namely: ammonium sulfate and its dissociation products.

2. To provide a comparatively economical means of meeting the soil's immediate plant food needs, as well as providing for its future necessities in a manner similar to that of finely ground phosphate rock.

In practising my process, I take a batch of alunite, leucite, muscovite or orthoclase, ground to 130 mesh or any mesh between 60 and 200, taken either collectively or individually and treated with suitable proportions of ammonium sulfate, at temperatures at or below 150° centigrade and pass the mixture through all intermediate temperatures up to and above 400° centigrade in suitable containers, such, for example, as retorts of various designs modified for intermittent or continuous operation. The heating operation may be accomplished by any desirable method, such, for example, as waste gases. The gaseous products produced by heating ammonium sulfate are absorbed in water or sulfuric acid to partially regenerate ammonium sulfate or ammonium acid sulfate or other nitrogen sulfur substances, the fused material tapped out in a manner similar to a slag, cooled and ground to the desired degree of fineness for the trade.

By direct fusion with the dissociation products of ammonium sulfate a considerable amount of the potash present in either alunite, leucite, muscovite or orthoclase ground to 130 mesh or any mesh between 60 and 200 is rendered directly available for agricultural purposes, and by a previous heating of either alunite, leucite, muscovite or orthoclase ground to 130 mesh or any mesh between 60 and 200, to about 900° centigrade and then fusing with ammonium sulfate or its dissociation products, the potash present in those minerals is rendered more available than without such treatment.

The advantages of my invention are:

Due to the reactions which take place, both water soluble and two per cent. citric acid soluble potash compounds are produced when ammonium sulfate is fused with either alunite, leucite, muscovite, or orthoclase. When water is brought in contact with the fusion products of ammonium sulfate and either alunite, leucite, muscovite, or orthoclase, there is a continuous solubility of the potash in those minerals until the ammonium acid sulfate, ammonium pyrosulfate and other fusion products of ammonium sulfate are removed from contact with the previously mentioned potash bearing minerals.

The action of the dissociation products of ammonium sulfate on the aforementioned potash bearing minerals takes place with a minimum expenditure of heat energy, inasmuch as the temperature range causing the fusion begins at or below 150° centigrade and reaches a maximum at about 400° centigrade.

Under proper physical conditions, any ammonia or sulfur trioxid or sulfur dioxid expelled by heating at or near the dissociation temperature of the ammonium sulfate may be recovered as ammonium sulfate, ammonium acid sulfate, sulfites and nitrogen sulfur derivatives or other solution dissociation products, in any well known way.

The resulting fusion product is in such a condition that, by means of suitable grinding and mixing, it can be readily made to conform to fertilizer trade requirements.

That due to the facility of recovering the volatile reaction products of ammonium sulfate, expelled with so little expenditure of heat energy and the obtaining of a final fusion product containing both available potash and nitrogen, the invention is essentially an economical one for the production of a good grade of a mixed potash and nitrogenous fertilizer, provided that the cost of obtaining the raw materials is not prohibitive.

Having thus described my invention, I claim:

1. A process for producing a mixed potash and nitrogen fertilizer consisting in grinding alunite, muscovite, orthoclase and leucite separately to 130 mesh and mixing them, and then adding ammonium sulfate thereto, heating the mixture in suitable containers at temperatures between 150° centigrade and through all intermediate temperatures up to and including 400° centigrade until the gaseous decomposition products of the ammonium sulfate are copiously evolved, substantially as described.

2. A process for producing a mixed potash and nitrogen fertilizer consisting in grinding alunite, muscovite, orthoclase and leucite to mesh ranging from 60 to 200 mesh and mixing them, and then adding ammonium sulfate thereto, heating the mixture in suitable containers at temperatures below 150° centigrade and through all intermediate temperatures up to and including 400° centigrade until the gaseous decomposition products of the ammonium sulfate are copiously evolved, substantially as described.

In testimony whereof, I affix my signature in the presence of two subscribing witnesses.

ROBERT F. GARDINER.

Witnesses:
 THOMAS SHAW,
 GEORGE L. HOFFMAN.